Figure 2:
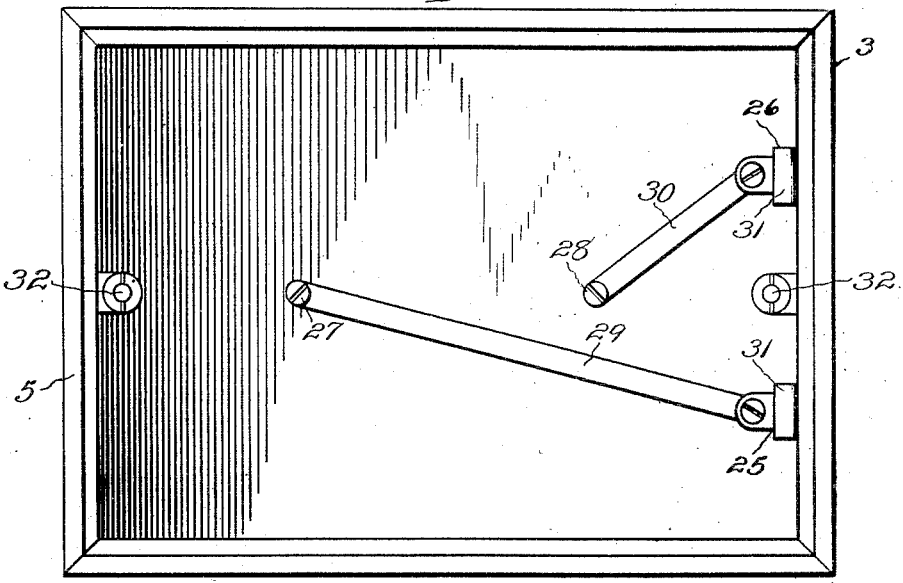

G. N. WATERBURY, Jr.
BATTERY HOLDER.
APPLICATION FILED DEC. 7, 1911.
1,076,927.
Patented Oct. 28, 1913.
4 SHEETS—SHEET 1.
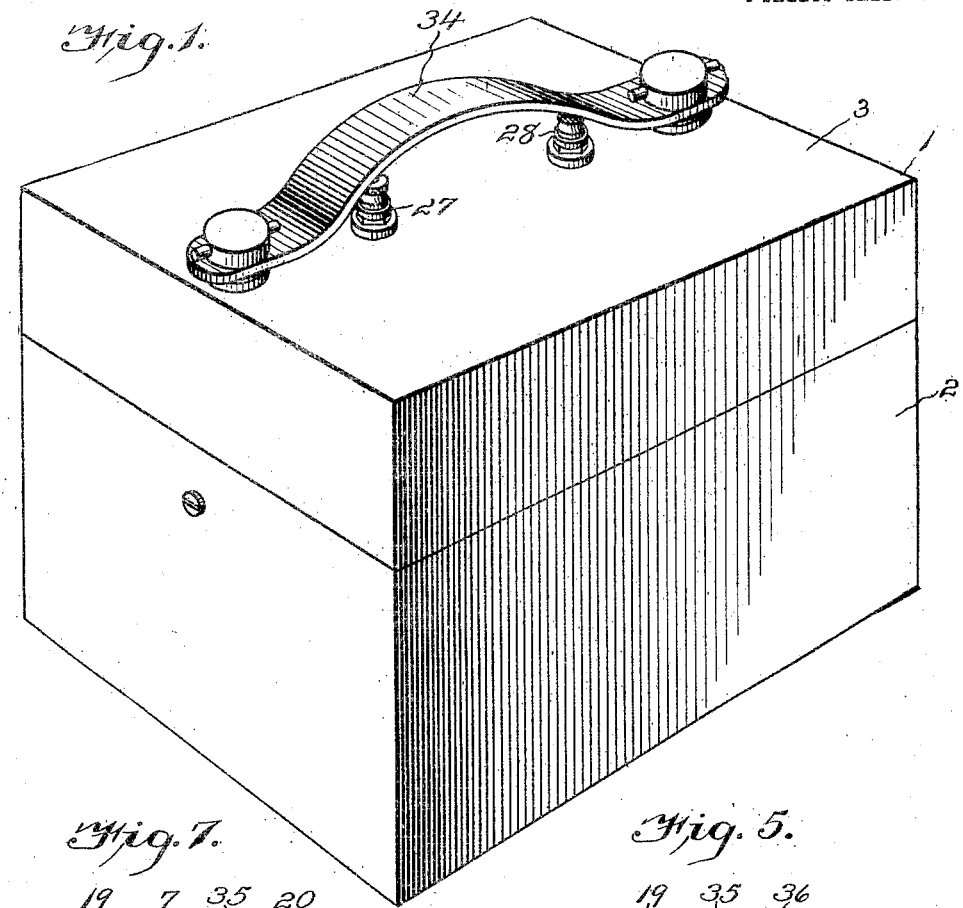
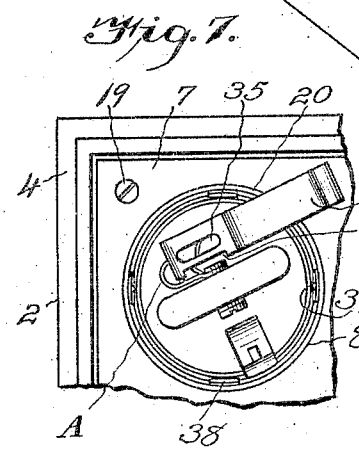
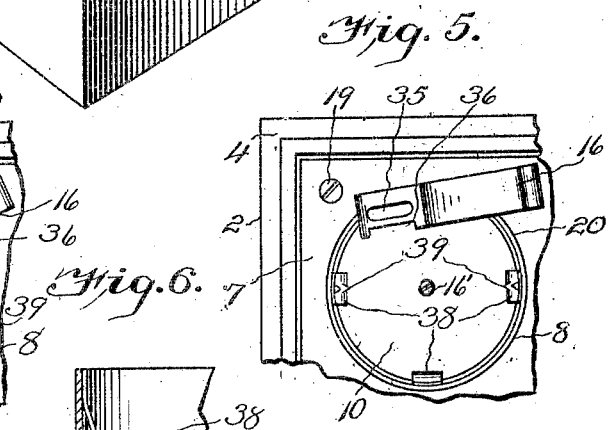
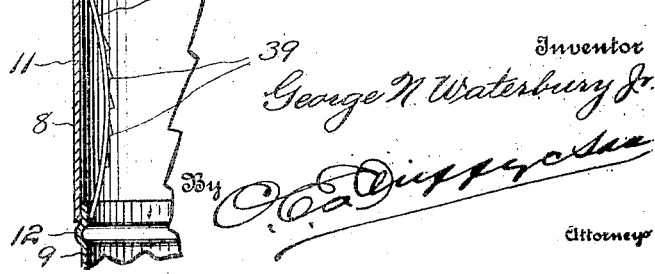

G. N. WATERBURY, Jr.
BATTERY HOLDER.
APPLICATION FILED DEC. 7, 1911.

1,076,927.

Patented Oct. 28, 1913.
4 SHEETS—SHEET 2.

Witnesses
J. P. Britt
E. C. Duffy

Inventor
George N. Waterbury, Jr.
By C. E. Duffy
Attorneys

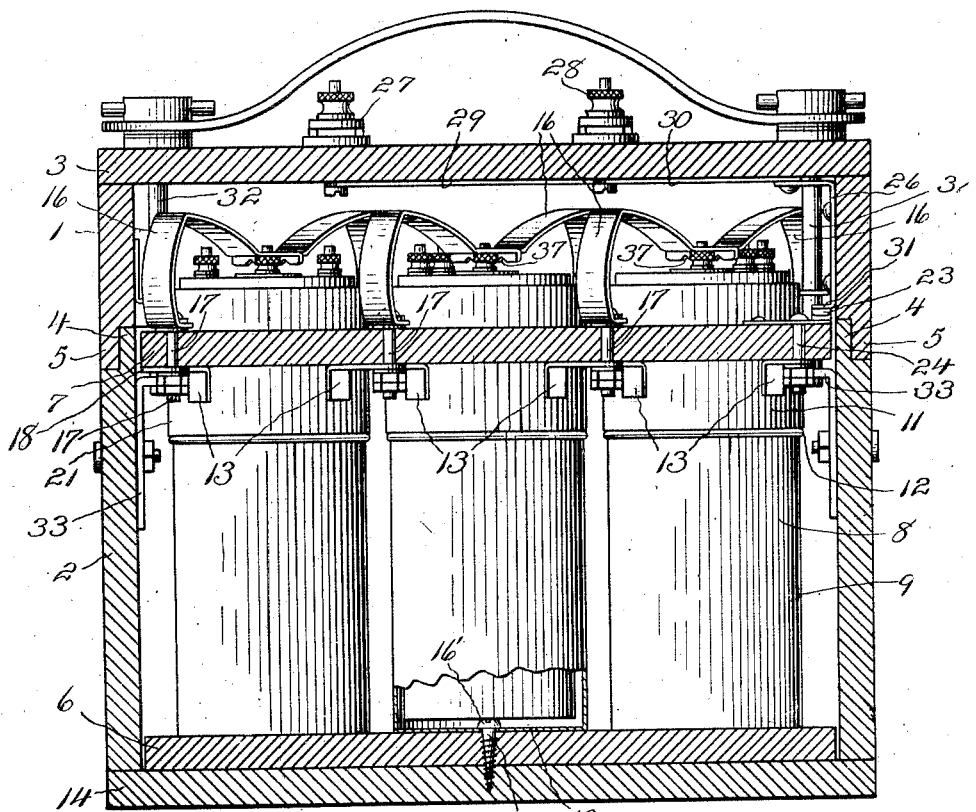
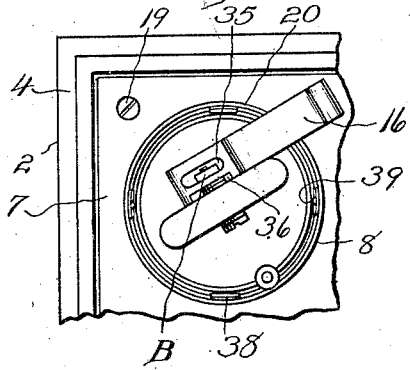 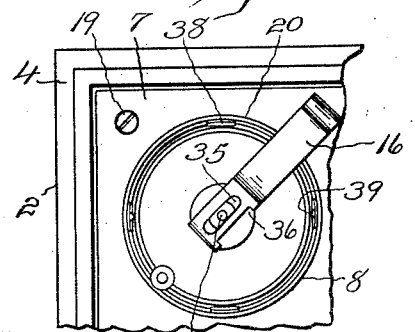

G. N. WATERBURY, Jr.
BATTERY HOLDER.
APPLICATION FILED DEC. 7, 1911.

1,076,927.

Patented Oct. 28, 1913.

4 SHEETS—SHEET 4.

Witnesses
J. P. Britt
E. C. Duffy

Inventor
George N. Waterbury Jr.
By
Attorneys

UNITED STATES PATENT OFFICE.

GEORGE N. WATERBURY, JR., OF WASHINGTON, DISTRICT OF COLUMBIA.

BATTERY-HOLDER.

1,076,927.  Specification of Letters Patent.  Patented Oct. 28, 1913.

Application filed December 7, 1911. Serial No. 664,398.

*To all whom it may concern:*

Be it known that I, GEORGE N. WATERBURY, Jr., a citizen of the United States, residing at Washington, District of Columbia, have invented certain new and useful Improvements in Battery-Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a cage or holder for dry cell electric batteries, and has for its object to provide a holder which is particularly designed for automobile or motor boat use, although as will be clearly evident the same can be advantageously employed in any capacity requiring the use of a series of electric dry cells.

A further object of the invention is to provide a cage or holder for the reception of a series of electric dry cells which are conveniently arranged in a suitable case for service and for transportation.

A further object of the invention is to provide a battery cage wherein the cells can be connected in series for service eliminating the use of wire from the binding posts of the cells and from the cells to the case.

A further object of the invention is to provide a battery cage which will accommodate any electric dry cell of standard size and which does not require any special form of dry cell or binding post.

A further object of the invention is to provide a battery cage in which the battery connectors are so constructed and arranged that they will conform to any style of binding post now employed on electric dry cells.

A further object of the invention is to provide a battery cage in which the cells can be immediately inserted and connected or disconnected and removed without the use of tools, implements or appliances, and without connecting or disconnecting any wires or manipulating the binding posts on the cells.

A further object of the invention is to provide a battery cage which can be quickly and easily inspected while the cells are in service in such manner that any disconnection or break in the circuit can be readily ascertained.

A further object of the invention is to provide certain new and useful improvements in battery holders over the U. S. Patent granted to me on April 11th 1911, #989,738, which improvements particularly consist in the mounting of the battery cage stationary in the casing so as not to be readily removable therefrom, and in the arrangement of electrical contacts on the battery cage and on the readily removable top or cover of the casing in such manner that an automatic electrical contact is effected when the readily removable top of the casing is placed in proper position on the body portion of the casing.

The invention also consists in the novel construction of the cylindrical holders for the electric dry cells.

The invention further consists in the novel construction of the battery connectors which will conform to any type of dry cell now in common use.

The invention further consists in the construction which provides for the entire removal of one or more dry cells from the series of dry cells without breaking the circuit.

The invention consists in the novel construction of the improvements employed for effecting contact between the zinc or negative pole on each of the electric dry cells with its cell holder.

The invention further consists in certain other novel details of construction and in combinations of parts, all of which will be first fully described and afterward specifically pointed out in the appended claims.

Figure 3:
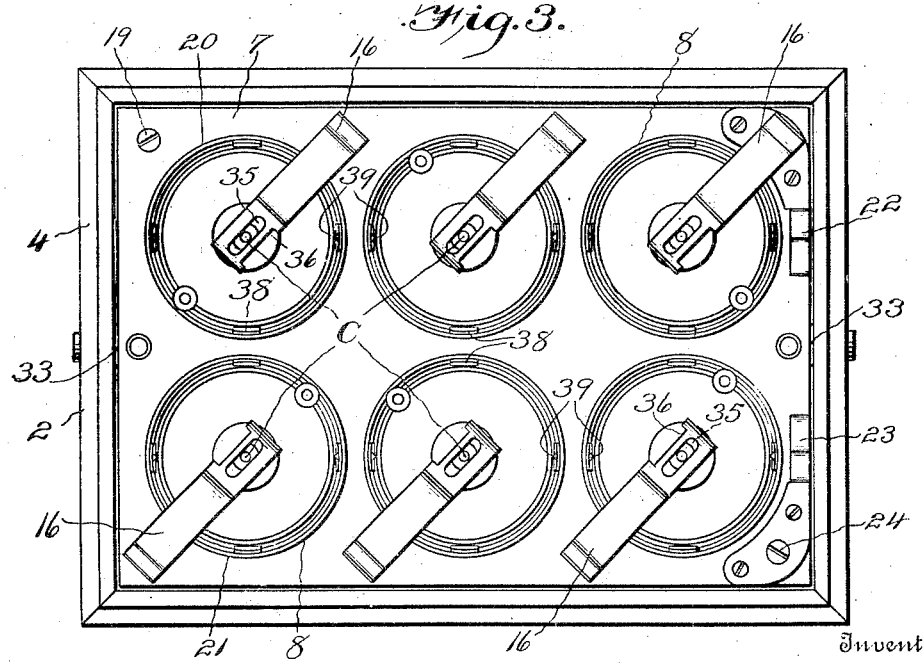
Figure 10:
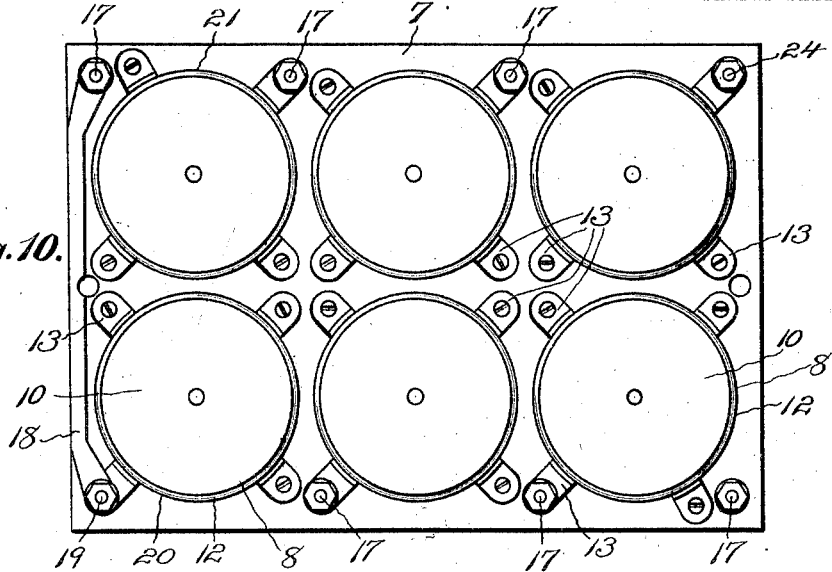
Figure 11:
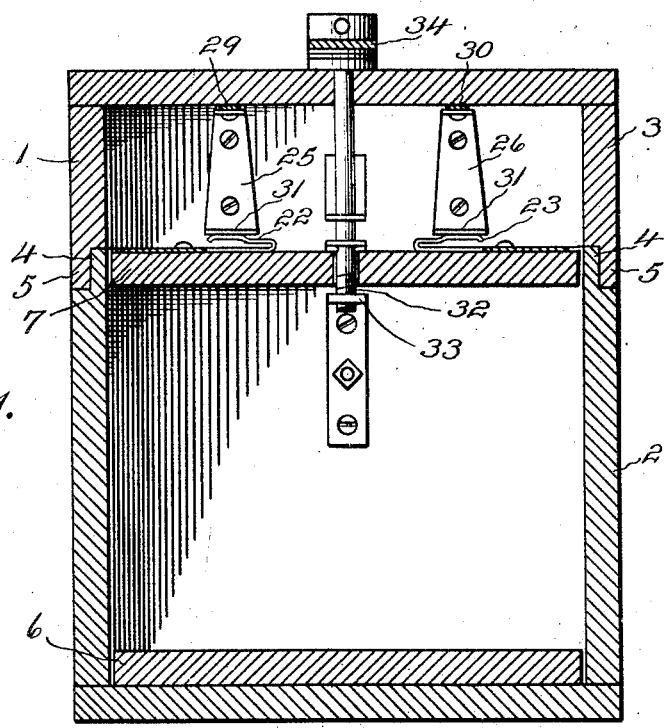

Referring to the accompanying drawings forming a part of this specification, Figure 1 is a perspective view of the casing illustrating the arrangement and location of the binding posts thereon which are automatically connected with the dry cells within. Fig. 2 is a bottom plan view of the removable top or cover of the casing. Fig. 3 is a top plan view of the lower or body portion of the casing illustrating the battery cage therein and the electric dry cells in a connected and operative position. Fig. 4 is a vertical longitudinal sectional view through the casing and through the battery cage. Fig. 5 is a fragmentary plan view illustrating one of the spring battery connectors in contact with its cell holder, the electric cell being removed from the holder. Fig. 6 is a fragmentary sectional view through the upper or sleeve portion of one of the cell holders illustrating the serrated spring contact therein. Fig. 7 is a fragmentary plan view illustrating one electric dry cell and its spring connector, the dry cell illustrated in this figure being of an unusual type which embodies a peculiar binding post at the carbon pole. Fig. 8 is a similar view illustrating one of the spring connectors in contact with the carbon or positive pole of an electric dry cell of usual type. Fig. 9 is a similar view illustrating one of the spring connectors in contact with the carbon or positive pole of an electric dry cell of usual type. Fig. 10 is a bottom plan view of the cell holders illustrating the upper board of the cage in plan, the base board of the cage being removed, and Fig. 11 is a transverse vertical sectional view through the casing and base and upper board of the cage illustrating the means for effecting an automatic electrical contact between the removable cover of the casing and the cage for the cells.

Like numerals of reference will be employed to indicate the same parts throughout the several figures.

For a proper understanding of this invention and for convenience in referring to the accompanying drawings attention is directed to the form of binding post at the carbon or positive pole of electric dry cells as illustrated in Figs. 7, 8 and 9. The type of binding post illustrated in Fig. 7 will for convenience be designated by the letter "A", while the types of binding posts at the carbon or positive poles of the cells illustrated in Figs. 8 and 9 will for convenience be designated by the letters "B" and "C" respectively.

Referring now to the construction of the cage and casing the numeral 1 indicates the casing for the cage which comprises the bottom or body portion 2, and 3 the readily removable top or cover, the upper edge of the bottom or body 2 being rabbeted at 4 to receive the rabbeted bottom edge 5 of the removable top or cover 3, this construction as will appear from Fig. 4 providing a tight and effective closure of the casing for the purpose of preventing moisture and dust or dirt from entering the interior of the same, it being of course well known that for efficiency the electric dry cell should be kept as dry as possible and free from an undue amount of moisture.

As will appear from Fig. 4 the battery cage within the casing 1 comprises a base board 6 and an upper board 7, and it will be particularly noted that no vertical or brace piece or stays are provided or employed in the arrangement or construction of the cage. The said upper board 7 is provided with a series of circular openings or apertures to accommodate the cell holders 8, said cell holders 8 being made up of a cylindrical metallic base 9 having a metallic bottom 10 and an upper metallic sleeve portion 11, the said cylindrical metallic base 9 being provided near its upper edge (Fig. 6) with an annular projecting bead 12, the cylindrical sleeve portion 11 passing over the upper edge of the cylindrical base portion 9 and bottoming on the annular projecting bead 12 formed in the cylindrical base portion 9 as is clearly shown in Fig. 6. The purpose of this construction is to absolutely insure a uniform height of each of the cell holders and to conveniently support the upper board 7 of the cage uniformly within the casing and to eliminate the necessity of any vertical brace or stays between the base board 6 and the upper board 7 of the cage. In this connection reference is particularly made to Fig. 10 which illustrates in plan the under surface of the upper board 7 of the cage, and it will be seen that upon each of the cylindrical sleeve portions of the cell holders is arranged four lugs 13 which engage said lower surface of the upper board 7 and effectively tie and support the said upper board 7 in a proper and uniform position within the casing. As will appear in Fig. 4 the cell holders are permanently fastened to the base board 6 and to the bottom 14 of the casing 1 by means of suitable wood screws 15, said wood screws 15 being preferably provided with round heads 16' upon which said cell-holders rest and whereby the latter are retained somewhat elevated from the bottom of their cells. It will be evident from this construction that the battery cage and cell holders are permanently secured within the casing so as not to be readily removable therefrom, it being entirely unnecessary for the proper operation of this invention to remove the cage and cell holders from the base or body portion of the casing.

Pivotally mounted upon the upper surface of the upper board 7 of the battery cage and adjacent to each of the cell holders is a spring connector 16, each of said connectors being pivotally secured in position by means of a bolt 17 passing vertically through the upper board 7 of the battery cage and through one of the lugs 13 which is connected to and carried on the cylindrical sleeve portion 11 of the cell holder in such manner that an electrical connection can be effected between the cylindrical sleeve portion 11 of a cell holder by means of the spring connector pivotally connected to one of the lugs 13 on said cylindrical sleeve portion 11 of the said holder.

As will appear from Fig. 10 a connection 18 is provided on the upper board 7 of the battery cage for effecting an electrical connection between the zinc or negative pole 19 of the end cell holder 20 to the spring connector, which is pivotally mounted at 17, for a carbon or positive pole of the cell in the opposite end cell holder 21, and by referring to Fig. 3 it will be seen that at the opposite end of the upper board 7 of the battery cage and on the outer face thereof is arranged a spring contact 22 which is connected to the spring connector 16 for the carbon or positive pole of its cell; while a similar spring contact 23 is arranged on the face of the upper board 7 of the battery cage which is in contact with the zinc or negative pole of the series through the medium of the lug 13 on the cell holder adjacent thereto, the connection between the said spring contact 23 and the lug 13 of the adjacent cell being effected by means of a bolt 24 which passes vertically through the upper board 7 of the battery cage. When therefore the cells are in position as illustrated in Fig. 3 the spring contact 22 becomes the positive pole of the series while the spring contact 23 becomes the negative pole, said spring contacts 22 and 23 being shaped and formed as shown in Fig. 11 to receive the rigid contact pieces 25 and 26 which are arranged and carried on the removable top or cover 3 of the casing. As will appear from Fig. 2 a connection is made between each of the said rigid contact pieces 25 and 26 with the binding posts 27 and 28 (Figs. 1 and 4) by means of the metallic strips 29 and 30. In Fig. 2 the said rigid contact pieces 25 and 26 are shown as having horizontal projecting flanges 31 for engagement with the spring contact pieces 22 and 23 on the upper surface of the battery cage.

In order to effectively and rigidly fasten the removable top or cover 3 in position on the body of the casing any suitable fastening means may be employed, such as two vertically threaded bolts 32 (Fig. 11) passing through the upper board 7 of the battery cage and entering a threaded lug 33 fastened on the sides of the base or body portion 2 of the casing, and for convenience in arrangement the carrying strap 34 for the holder is connected to the removable top or cover 3 by means of the said vertical bolts 32 as clearly shown in Fig. 1.

Referring now to the construction of the spring connectors 16 reference is particularly made to Figs. 4, 7, 8 and 9. The end of each of the spring connectors is provided with a longitudinal slot 35 and a long notch or cutout portion 36 on the inner edge of each of the spring connectors adjacent the said slot 35, said notches 36 being substantially the same length as the slot 35 as clearly appears from the drawings. It will be seen, however, by referring to Fig. 4 that the extreme end of each of the spring connectors is bent downwardly substantially at right angles and is provided with a central V-shaped notch 37 (Fig. 4). In the construction of dry cells illustrated in Figs. 8 and 9 the slots 35 and elongated notches 36 engage the binding posts on the cells in a manner as shown in Figs. 8 and 9 to effect a good close electrical connection between the carbon or positive poles of said cells and the spring connectors 16. For the type of binding posts illustrated in Fig. 7 the slotted and elongated notched construction of the spring connector 16 is of no utility, but the said spring connector 16 having a normal downward tendency or tension engages the binding post A, the V-shaped notch 37 (Fig. 4) in the end of the spring connector 16 dropping over the vertical wall of the binding post A (Fig. 7) in the manner as illustrated in said figure in such way that a good close electrical contact is effected between the said binding post and the spring connector 16. As the three types of binding posts A, B and C (Figs. 7, 8 and 9) embody all of the types in common use it is at once apparent that the spring connector 16 constructed as shown and described is quickly applicable to effect a close electrical contact with all of these types. It therefore matters not as far as the operation of this invention is concerned what make or style of carbon or positive binding post is employed on the cells to be used as a good and efficient electrical contact can be effected with one as well as it can with the other. As it is the universal custom, however, to have the zinc casing for the dry cell form the zinc or negative pole of the battery all of the usual types of dry cells can be utilized in this battery holder. For effecting a good close connection between the zinc poles of the dry cells and the cell holders a plurality of arcuate leaf springs 38 are secured at their upper ends to the inner surface of the cylindrical sleeve portion 11 of each of the cell holders 8, one or more of said leaf springs 38 being serrated upon its convex surface, as shown at 39 (Figs. 5 and 6) for the purpose of scratching or cutting into the zinc casing of the dry cell when the same is introduced into the holder 8, thus effecting a close electrical connection between the zinc pole of the dry cell and its metallic holder 8, the lower ends of said springs being free to slide upon the base-portion 9 of said holder as the dry-cells contact with said springs, as in placing the dry-cells within the holder, as will be appreciated.

Having thus described the several parts of this invention its operation is as follows: The cells being arranged in the holders as shown in Fig. 3, and the spring connectors 16 being placed in position on the positive poles of the dry cells as shown, the removable top or cover 3 of the casing 1 is placed in position shown in Figs. 1, 4 and 11. When the top or cover 3 is in position on the bottom or body portion of the casing the rigid spring contact pieces 25 and 26 on the said top or cover 3 engage the spring contact pieces 22 and 23 on the battery cage and automatically connect the binding posts 27 and 28 on the said top or cover 3 of the casing with the electrical dry cells within the battery cage. The fastening means for holding the top or cover 3 to the body 2 of the casing is provided to rigidly and effectively hold the top or cover 3 in proper position on the casing and at the same time effectively holds the rigid contact pieces 25 and 26 in a good close electrical contact with the spring contact pieces 22 and 23 on the battery cage. In order therefore to wire up the holder to the work to be done the positive and negative wires need only be connected to the positive and negative binding posts 27 and 28 on the top or cover 3 of the casing 1. Should, however, it be desired to remove one or more of the dry cells from the cage and still maintain the circuit said one or more cells can be quickly lifted out of its or their holders and the spring connector or connectors 16 swung on their pivots into position shown in Fig. 5, in which position the V-shaped notch 37 of each of the spring connectors 16 will engage the vertical wall of the battery metallic holder as shown in Fig. 5, thus connecting the zinc pole of one battery to the metallic battery holder of the adjacent battery, which metallic battery holder is in turn connected by means of the following or adjacent spring connector 16 to the carbon or positive pole of the following or adjacent electric dry cell. The only effect such an arrangement has upon the circuit is the cutting out of one or more cells which may weaken or strengthen the circuit according to the condition of the cells, it being of course well known that a dead cell in a circuit is detrimental to the circuit, and has the effect of weakening the same; consequently the voltage of the circuit could be improved by withdrawing the dead cell or cells and connecting the spring connectors 16 in a manner as shown in Fig. 5. When the cells are in good serviceable condition the voltage of the circuit can be quickly reduced to any proper working voltage by simply withdrawing one or more cells from their holders and placing the spring connector 16 in position shown in Fig. 5 without causing a permanent break in the circuit, it being of course understood that a momentary break will be occasioned as soon as the spring connector 16 is removed from the carbon or positive pole of its battery and will remain broken until the said spring connector 16 is arranged in contact with the metallic cell holder as shown in Fig. 5. In order, however, to permanently break the circuit or to utilize one of the spring connectors 16 as a switch, said spring connector can be swung on its pivot off its carbon or positive pole and out of engagement with the metallic cell holder as will be apparent from the construction illustrated in the drawings.

Having thus fully described the invention what I claim as new and desire to secure by Letters Patent of the United States is:—

1. A holder for dry cell electric batteries comprising a casing, said casing having a body portion and a removable top, a cage provided with means for receiving dry cell electric batteries, said cage being permanently secured to the body portion of the said casing, means on said cage for effecting electrical connections with said dry cell electric batteries, a pair of electrical spring contacts arranged on said cage and permanently connected thereto, a pair of electrical contact pieces on said top of said casing and permanently attached thereto, said electrical contact-pieces having lateral flanges at their lower ends, to engage and contact with said pair of electrical contacts on said cage when said top is applied to the body portion of the casing, suitable binding posts on said top and electrical connections between the said contact pieces on said top and the said binding posts, the whole arranged in such manner that the said electric dry cells are connected to the said binding posts when the said removable top is in position on the body of the casing and the electrical connection between the said electric dry cells and the said binding posts is broken when the said removable top is removed from the body of the casing.

2. A holder for dry cell electric batteries comprising a casing having a body portion and a removable top, a battery cage arranged in said body portion and permanently connected thereto, means on said cage for effecting electrical connections between the cells therein, a pair of electrical contacts on said cage, a pair of electrical contacts on said removable top, said last mentioned electrical contacts being provided with lateral flanges at their lower ends adapted to engage and contact with the electrical contacts on said cage when the said removable top is in position on the body portion of the casing, substantially as described and for the purposes set forth.

3. A holder for dry cell electric batteries comprising a casing having a body portion and a removable top, a battery cage in said body portion and permanently connected thereto, and means for effecting an electrical connection between the said cage and the said removable top when the said removable top is in position on the body portion of the casing, said electrical connection including contact-members depending from said top and having lateral flanges at their lower ends, said cage body portion being equipped with contact-members adapted to be engaged by said contact-member flanges.

4. A battery holder comprising a cage to receive electric dry cells, means for effecting an electrical connection between the zinc pole of one cell and the zinc pole of an adjacent cell, said means comprising an electrical spring contact for each cell mounted on the said cage, each electrical spring contact being provided with a longitudinal slot near the free end thereof, a longitudinal notch adjacent said longitudinal slot near the free end thereof, said contact being provided with a vertically disposed notch in the free end thereof, said longitudinal slot, longitudinal notch and vertically disposed notch being adapted to engage the zinc pole of electric dry cells of various forms and designs, substantially as described and for the purposes set forth.

5. A battery holder comprising a battery cage to receive electric dry cells, means for effecting an electrical connection between the zinc pole of one cell and the zinc pole of an adjacent cell, said means comprising an electrical arcuate spring contact mounted on said cage for each cell therein for engagement with the positive pole of each cell, each of said electrical spring contacts being provided upon its convex surface with serrations to effect an electrical contact with the positive pole of an electric dry cell.

6. A battery holder comprising a cage, a series of metallic cell holders in said cage to receive electric dry cells, means for effecting an electrical connection between the zinc pole of each electric dry cell and its metallic cell holder including a pivoted resilient connector-member having a notched terminal adapted to engage the top edge of said cell-holder, means for effecting an electrical connection between the positive pole of each of the dry cells and its adjacent metallic cell holder, said means including means for effecting an electrical connection between the negative pole of one cell holder and the metallic cell holder of its adjacent cell in such manner as to cut out of the series a cell within the said cage.

7. A battery-holder including a cage, a plurality of metallic cell-holders located therein to receive a plurality of electric dry-cells, means for establishing electric connection between each of the metallic cell-holders and its electric dry-cell, means for effecting an electric connection between the positive pole of each of said electric dry-cells and the metallic cell-holder of its adjacent cell, comprising a pivoted resilient connector-member having a downturned notched terminal for effecting connection with the top edge of said cell-holder, a closure for said cage, a pair of electric contacts upon said closure, a pair of electric contacts upon said cage, said first referred to contacts having engagement with the latter pair of contacts when said closure is in closed position upon said cage.

8. A battery-holder including a casing having a removable closure, a cage provided with metallic holders for receiving dry-cell electric batteries, means for establishing electric connection between each of said metallic holders and its dry-cell, means for establishing electric connection between the positive pole of each of said electric dry-cells and the metallic cell-holder of its adjacent cell comprising a pivoted resilient connector-member having a downturned notched terminal for effecting connection with the top edge of said cell-holder, means applied to said closure for establishing electrical connection with said dry-cell electric batteries, a pair of electric spring contacts arranged upon said cage, a pair of electric contacts upon said closure having their lower end terminals adapted to engage said pair of electric contacts arranged upon said cage when said closure is prone upon said casing, binding posts upon said closure and electrical connections between said contacts upon said closure and said binding posts substantially as described and for the purpose set forth.

9. A battery holder comprising a cage, a plurality of cell holders in said cage to receive electric dry cells, each of said cell holders comprising a body portion and a collar or sleeve portion, the said body portion of each of the electric cell holders being provided with an annular projecting bead, the said collar or sleeve portion of each of said cell holders passing over the upper end of the body portion of its cell holder and bottoming against the said projecting annular bead on the said body portion of each of the said cell holders, substantially as described and for the purposes set forth.

10. A battery, including a cage, a cell-holder within the latter, means for establishing an electrical connection between said cell-holder and the contained dry cell, said cell-holder comprising a sleeve member and a body member having an outstanding beadlike shoulder thereon to limit the slipping of said sleeve-member upon said body member, said sleeve member having upon its inside a leaf-spring with one end fixed thereto and its other end depending into said body-member, said leaf-spring being serrated for engagement with the dry cell.

In testimony whereof I affix my signature, in presence of two witnesses.

GEORGE N. WATERBURY, Jr.

Witnesses:
 JOHN L. FLETCHER,
 M. A. MULLEN.